(12) United States Patent
Huang

(10) Patent No.: US 8,704,657 B2
(45) Date of Patent: Apr. 22, 2014

(54) METHOD FOR REMINDING OBJECTS BEING AWAY AND COMMUNICATION DEVICE AND COMPUTER READABLE MEDIUM USING THE SAME METHOD

(75) Inventor: Hsiang-Tai Huang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 224 days.

(21) Appl. No.: 13/401,813

(22) Filed: Feb. 21, 2012

(65) Prior Publication Data

US 2013/0214926 A1  Aug. 22, 2013

(51) Int. Cl.
G08B 1/08 (2006.01)
G06Q 10/08 (2012.01)
G08B 13/14 (2006.01)

(52) U.S. Cl.
CPC ............ *G06Q 10/08* (2013.01); *G08B 13/1427* (2013.01)
USPC ................................ 340/539.13; 340/539.21

(58) Field of Classification Search
CPC ............................ G06Q 10/08; G08B 13/1427
USPC ...................... 340/539.13, 539.21, 8.1, 573.3; 455/456.1; 701/517, 519
See application file for complete search history.

(56) References Cited

U.S. PATENT DOCUMENTS

| | | | | |
|---|---|---|---|---|
| 5,949,350 A | * | 9/1999 | Girard et al. ................... | 340/8.1 |
| 6,198,390 B1 | * | 3/2001 | Schlager et al. ......... | 340/539.13 |
| 6,441,778 B1 | * | 8/2002 | Durst et al. ................... | 701/517 |
| 6,480,147 B2 | * | 11/2002 | Durst et al. ................... | 701/491 |
| 7,446,664 B2 | * | 11/2008 | White ......................... | 340/573.1 |
| 8,140,012 B1 | * | 3/2012 | Causey et al. ................. | 340/8.1 |
| 2009/0207015 A1 | * | 8/2009 | Diem ....................... | 340/539.13 |
| 2010/0097208 A1 | * | 4/2010 | Rosing et al. ............. | 340/539.13 |
| 2013/0005354 A1 | * | 1/2013 | Sheilendra ................ | 455/456.1 |

* cited by examiner

*Primary Examiner* — John A Tweel, Jr.
(74) *Attorney, Agent, or Firm* — Jianq Chyun IP Office

(57) ABSTRACT

A method for reminding objects being away, a communication device and a computer readable medium using the same method are proposed. The proposed method is adapted to the communication device, and includes the following steps. Location information of the communication device is recorded. A connection between the communication device and a specified object is established. A safety zone of the specified object is configured according to a user configuration signal. It is determined whether the specified object is away from the communication device, which is carried by the user. It is further determined whether the specified object is not in the safety zone. When the specified object is determined to be away from the communication device and is not in the safety zone, an alarm signal is provided to the user.

17 Claims, 6 Drawing Sheets

METHOD FOR REMINDING OBJECTS BEING AWAY AND COMMUNICATION DEVICE AND COMPUTER READABLE MEDIUM USING THE SAME METHOD

BACKGROUND OF THE INVENTION

1. Field of the Invention

The invention relates to a method for reminding objects being away. Particularly, the invention relates to a method for reminding objects being away which is implemented through a communication technique, and a communication device and a computer readable medium using the same method.

2. Description of Related Art

An object reminding device in the market can be connected to a handheld device of a user through a Bluetooth (BT) communication technique. Once the object reminding device is disconnected from the handheld device, the object reminding device starts to vibrate or outputs sounds. Since a BT transmission power is limited, when the user holding the handheld device moves from one room to another room in the house, the handheld device is probably disconnected from the object reminding device. In this case, although the object is still located at a safe place, the object reminding device may still output an alert signal to notify the user that the object is away. Obviously, such alert signal is a disturbance to the user. Therefore, how to ameliorate a determination mechanism of the current object reminding device to ensure the user getting the alarm signal without over-warning is an important problem required to be resolved.

SUMMARY OF THE INVENTION

The invention is directed to a method for reminding objects being away and a communication device and a computer readable medium using the same method. By using a wireless communication technique to determine whether a specified object is in a predetermined safety zone, a situation of sending an unnecessary alert signal to a user when the specified object is away from the user is avoided, and meanwhile when the specified object is not in the predetermined safety zone and is away from the user, a warning signal is provided to the user.

According to an embodiment of the invention, there is proposed a method for reminding objects being away. The proposed method is adapted to a communication device, and includes the following procedures. Location information of the communication device is recorded. A connection between the communication device and a specified object is established. A safety zone of the specified object is configured according to a user configuration signal. It is determined whether the specified object is away from a predetermined range of the communication device carried by a user. It is determined whether the specified object is not in the safety zone. When it is determined that the specified object is away from the predetermined range of the communication device and is not in the safety zone, an alarm signal is provided to the user.

According to an embodiment of the invention, there is proposed a communication device, which is adapted to remind objects being away, and includes a positioning module, a control module, a communication module and an alarm module. The positioning module is configured to obtain a current location of the communication device. The communication module is configured to establish a connection with a specified object. The control module is connected to the positioning module and the communication module, and is configured to record the current location of the communication device, configure a safety zone of the specified object according to a user configuration signal, determine whether the specified object is away from a predetermined range of the communication device carried by a user, and determine whether the specified object is not in the safety zone. Moreover, the alarm module is connected to the control module, and is configured to provide an alarm signal to the user when the control module determines that the specified object is away from the predetermined range of the communication device and is not in the safety zone.

According to an embodiment of the invention, there is proposed a computer readable medium, which stores a computer executable program, and when the computer executable program is loaded to a communication device, the communication device executes the following steps. Location information of the communication device is recorded. A connection between the communication device and a specified object is established. A safety zone of the specified object is configured according to a user configuration signal. It is determined whether the specified object is away from a predetermined range of the communication device carried by a user. It is determined whether the specified object is not in the safety zone. When it is determined that the specified object is away from the predetermined range of the communication device and is not in the safety zone, an alarm signal is provided to the user.

According to the aforementioned descriptions, embodiments of the invention provide the method for reminding objects being away, the communication device and the computer readable medium using the same method. By using a wireless communication technique to determine whether the specified object is in the predetermined safety zone, a situation of sending an unnecessary alert signal to the user when the specified object is away from the user is avoided.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

A method for reminding objects being away, a communication device and a computer readable medium using the same are provided in the present disclosure. In the proposed method for reminding objects being away, it is detected whether a handheld device is currently away from a specified object within a user-defined safety zone. When the specified object is not in the safety zone, the handheld device immediately outputs a warning sound signal to remind the user to bring the specified object. When the specified object is in the safety zone and is away from the handheld device, the handheld device does not output the warning sound signal, but merely records current environmental parameters (for example, a current time, a current geographic location, a device name of a nearby device, recording surrounding audio signals, etc.).

In the method for reminding objects being away, the handheld device can continually record an everyday passing route of the user through a global positioning system (GPS) or a positioning technique of a wireless communication system (for example, an AGPS technique), and after continually recording the passing route of the user for several days or several hours, the handheld device can gradually learn locations of the user's house and a working place. The user can configure the house and the working place as safety zones through screen prompt of the handheld device. Moreover, the user can also configure other safety zones through an electronic map of the handheld device.

When a valuable (i.e., the specified object) of the user also has a wireless communication functionality (for example, a Bluetooth (BT) functionality or a wireless fidelity (Wi-Fi) functionality), the handheld device of the user can detect whether the specified object is close to the user through the wireless communication functionality. When the handheld device detects that the specified object is not located around the user, the handheld device further detects whether the specified object is currently in the aforementioned safety zones. If it is determined that the specified object is in the safety zone, the handheld device merely records current environmental parameters (for example, time, location, sound, image, name or a unique number of a nearby device, etc.) for later query. In this case, the handheld device does not output any alarm signal (for example, sound, vibration and screen prompt, etc.) to avoid disturbing the user. When the handheld device detects that the specified object is not in the predetermined safety zones, which means that the specified object is away from the user and has a risk of being lost, then the handheld device immediately outputs the alarm signal to remind the user that the user should inspect the object.

Figure 1:
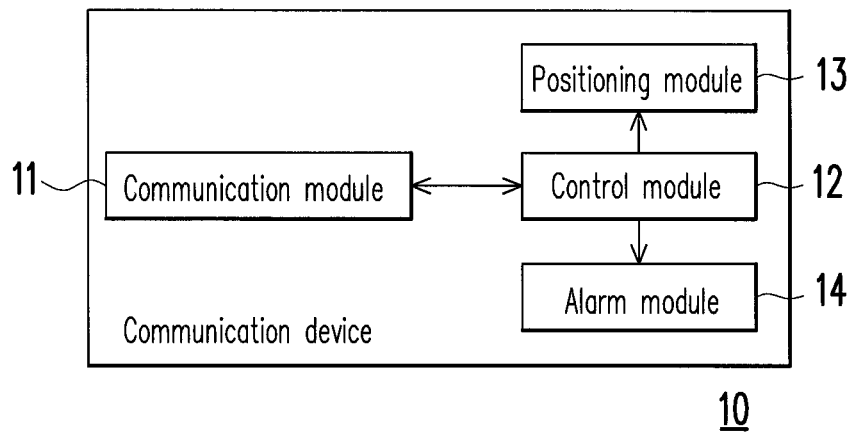
FIG. 1 is a functional block diagram of a communication device according to an embodiment of the invention.

FIG. 1 is a functional block diagram of a communication device according to an embodiment of the invention. Referring to FIG. 1, the communication device 10 is adapted to execute the method for reminding objects being away. The communication device 10 continually detects a specified object of the user through a wireless communication functionality, and meanwhile determines a current location of the user and records the locations, and determines whether or not to provide an alarm signal to the user according to a detection result and the current location of the user, so as to remind the user that the specified object has a risk of being lost.

For the sake of simplicity, only necessary components of the communication device of the present embodiment are introduced in the present disclosure. Referring to FIG. 1, the communication device 10 includes a communication module 11, a control module 12, a positioning module 13 and an alarm module 14. The communication device 10 may further include other components, for example, an input unit (not shown), another communication module or a processing module (not shown), etc., and these components are less directly corresponding to the main ideas of the embodiment, so that details thereof are not introduced in the present disclosure.

Referring to FIG. 1, the communication module 11 is configured to establish a connection with an electronic device on the specified object of the user, or establish a connection with the specified object when the specified object is an electronic device. The connection is for example, a BT connection or a connection established through a wireless fidelity (Wi-Fi) communication technique. The control module 12 is connected to the communication module 11, and is configured for continually detecting whether the specified object is disconnected, and accordingly determining whether the specified object is away from a predetermined range of the communication device 10 carried by the user. For example, the predetermined range can be a wireless signal coverage range of the communication device 10, or can be determined by the user.

The control module 12 may include a memory unit (not shown) and a processor (not shown). The memory unit can be configured to store the current location of the user and the predetermined range, which is configured for determining whether the specified object is away from the communication device carried by the user, and also store corresponding program codes (a software module or firmware program codes) of an algorithm, which is configured for determining whether the specified object is in a predetermined safety zone. The program codes can be executed by the processor to implement various functions of the control module 12.

The positioning module 13 is connected to the control module 12, and is configured for providing a geographic location (for example, longitude information and latitude information) of the communication device 10 to the control module 12, and the control module 12 continually records the latest geographic location of the communication device 10. The positioning module 13 can support a global positioning system (GPS) or an AGPS functionality provided by a mobile communication operator. Moreover, it is assumed that the user carries the communication device 10, so that the geographic location of the communication device 10 represents a current location of the user.

The alarm module 14 is connected to the control module 12, and is configured for receiving a control signal of the control module 12, and when the control module 12 determines to output an alarm signal to the user, the alarm module 14 outputs the alarm signal to the user. The alarm signal can be an audio signal, a video signal or a vibration alert for reminding the user that the user should inspect the specified object, so as to avoid the specific objector from being too far away from the user to cause a risk of being lost. Since the alarm signal can be the audio signal, a video signal or the vibration alert, the alarm module 14 may include an audio signal outputting unit (not shown), a video signal outputting unit, a vibration generating unit, or any combination of the aforementioned units, so as to provide a suitable alarm signal to the user.

In the present embodiment, the control module 12 of the communication device 10 can set an operation mode of the electronic device on the specified object, so that when the electronic device detects that the specified object is away from the communication device 10, the electronic device can determine whether or not to generate an alarm signal (or a warning signal) to remind the user of the current location of the specified object (the electronic device), so as to facilitate the user finding the specified object. Details of the method for reminding objects being away are described below with reference of FIG. 3.

Figure 2:
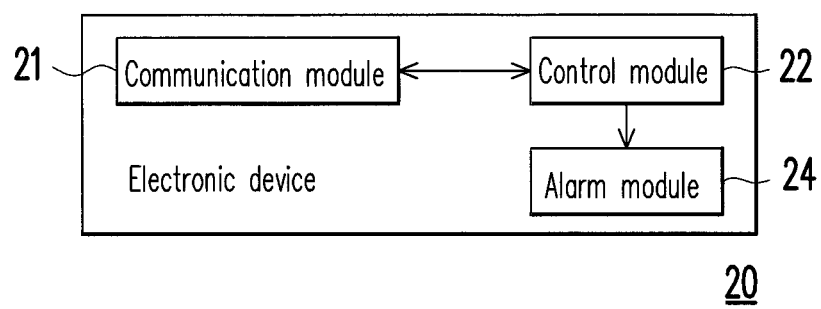
FIG. 2 is a functional block diagram of an electronic device according to an embodiment of the invention.

FIG. 2 is a functional block diagram of an electronic device according to an embodiment of the invention. The electronic device 20 can be embedded in or connected to the specified object, or can be the specified object itself. The electronic device 20 includes a communication module 21, a control module 22 and an alarm module 24. The communication module 21 is configured to establish a connection with the communication device 10. The connection is, for example, a BT connection or a connection established through a Wi-Fi communication technique. The control module 22 is connected to the communication module 21, and is configured for determining whether the electronic device 20 is away from the predetermined range of the communication device 10, or determining whether the operation mode of the electronic device 20 is set to an alarm mode. The alarm module 24 is connected to the control module 22, and is configured for receiving a control signal from the control module 22. When the control module 22 determines to output an alarm signal to the user, the control module 22 controls the alarm module 24 to output the alarm signal to the user. The alarm signal can be an audio signal, a video signal or a vibration alert to remind the user that the user should inspect the specified object, so as to avoid the specific object or from being too far away from the user to cause a risk of loss. Since the alarm signal can be the audio signal, the video signal or the vibration alert, the alarm module 24 may include an audio signal outputting unit (not shown), a video signal outputting unit (not shown), a vibration generating unit (not shown), or any combination of the aforementioned units, so as to provide a suitable alarm signal to the user.

The control module 22 can also set the electronic device 20 to a discoverable mode when the control module 22 determines that the electronic device 20 is away from the communication device 10, so as to facilitate other communication devices establishing a connection therewith, and transmit a current location of the electronic device 20 to a predetermined server. The electronic device 20 may further include other devices such as an input unit (not shown), another communication module or a processor (not shown), etc., and these components are less directly corresponding to the main ideas of the embodiment, so that details thereof are not introduced in the present disclosure.

Figure 3:
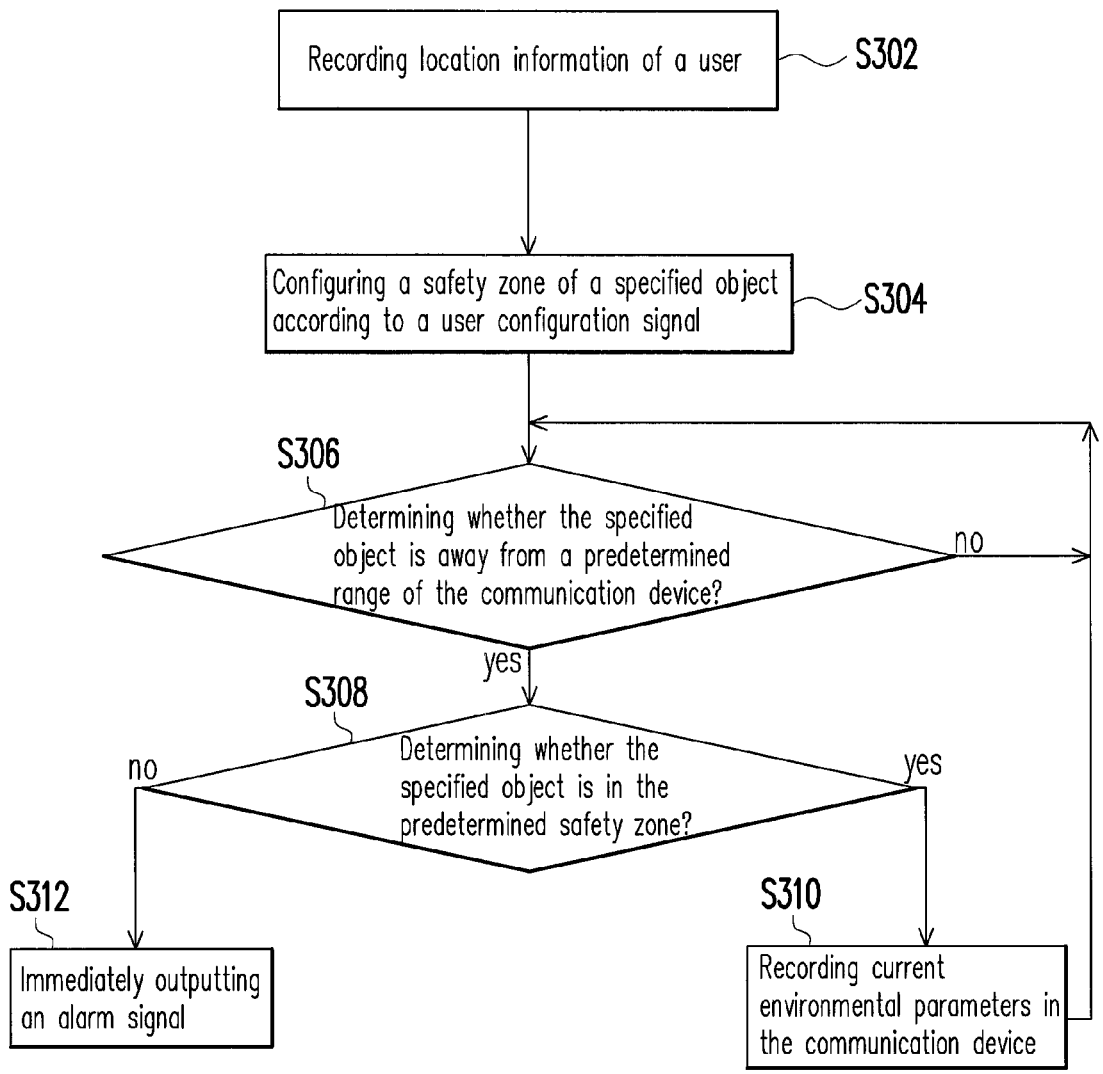
FIG. 3 is a flowchart illustrating a method for reminding objects being away according to an embodiment of the invention.

FIG. 3 is a flowchart illustrating a method for reminding objects being away according to an embodiment of the invention. Referring to FIG. 1, FIG. 2 and FIG. 3, the method for reminding objects being away starts from step S302. In the step S302, the control module 12 records location information of the user, and establishes a connection with a specified object through the communication device 11. In step S304, the control module 12 configures a safety zone of the specified object according to a user configuration signal. For example, the control module 12 queries the user whether to configure the safety zone of the specified object through a user interface, and recommends a safety zone to the user, and records the safety zone of the specified object after receiving the user configuration signal. For example, the safety zone can be a geographic location of the user's house and a predetermined range (for example, with a radius of 20 meters) around the user's house. Alternatively, the safety zone can be a geographic location of a working place and a predetermined range around the user's office. The steps S302 and S304 are initialisation steps of the method for reminding objects being away. As described previously, the control module 12 can continually record an everyday passing route of the user. After continually recording the passing route of the user for several days or several hours, the control module 12 can gradually learn locations of the user's house and the working place. Then, the control module 12 can assist the user to set the house and the working place as safety zones through a screen prompt of the communication device 10.

In step S306, the control module 12 determines whether the specified object is away from the communication device 10, i.e., determines whether the specified object is away from a predetermined range of the communication device 10 carried by the user. The predetermined range is, for example, a circle with a radius of 20 meters while taking the communication device 10 as a center (or an origin) of the circle. When a determination result indicates that the electronic device 20 is away from the predetermined range of the communication device 10, step S308 is executed after the step S306. When the determination result indicates that the electronic device 20 is not away from the predetermined range of the communication device 10 (for example, the connection between the electronic device 20 and the communication device 10 is still maintained), the step S306 is repeated after the step S306.

In the step S308, the control module 12 determines whether the specified object is in the predetermined safety zone. The control module 12 can perform the determination according to the continually-recorded current location of the user, and when the electronic device 20 is away from the predetermined range of the communication device, it is determined whether the electronic device 20 is in the predetermined safety zone. When a determination result indicates that the electronic device 20 is still in the predetermined safety zone, step S310 is executed after the step S308. When the determination result indicates that the electronic device 20 is not in the predetermined safety zone, step S312 is executed after the step S308.

In the step S310, the control module 12 records current environmental parameters in the communication device 10, where the environmental parameters are, for example, time, location, sound, image, and name or a unique number of a nearby device (for example, a medium access control (MAC) address). After the step S310, the step S306 is returned. In the step S312, the control module 12 controls the alarm module 14 to provide an alarm signal to the user. After the step S312, the method for reminding objects being away is ended. In a practical application, the aforementioned steps S306 to S312 can be executed in cycles to repeatedly execute the method for reminding objects being away. Moreover, when a distance between the specified object and the communication device 10 is too long (for example, more than a predetermined distance threshold value), and the specified object is not in the predetermined safety zone, an alarm signal is provided/output to the user.

In view of the specified object, the steps of the method for reminding objects being away are slightly different to the steps of FIG. 3. When the communication device 10 detects that the specified object (represented by the electronic device 20) is now in the safety zone, the communication device 10 sends a radio signal to the electronic device 20 on the specified object to set the operation mode of the electronic device 20 to a mute mode. When the communication device 10 detects that the electronic device 20 is not in the safety zone, the communication device 10 sends a radio signal to the electronic device 20 to set the operation mode of the electronic device 20 to an alarm mode. When the electronic device 20 detects that it is away from the predetermined range of the communication device 10, the electronic device 20 determines whether or not to output the alarm signal according to a setting value of the current operation mode. Technical details of the method for reminding objects being away in view of the specified object are described below with reference of FIG. 4.

Figure 4:
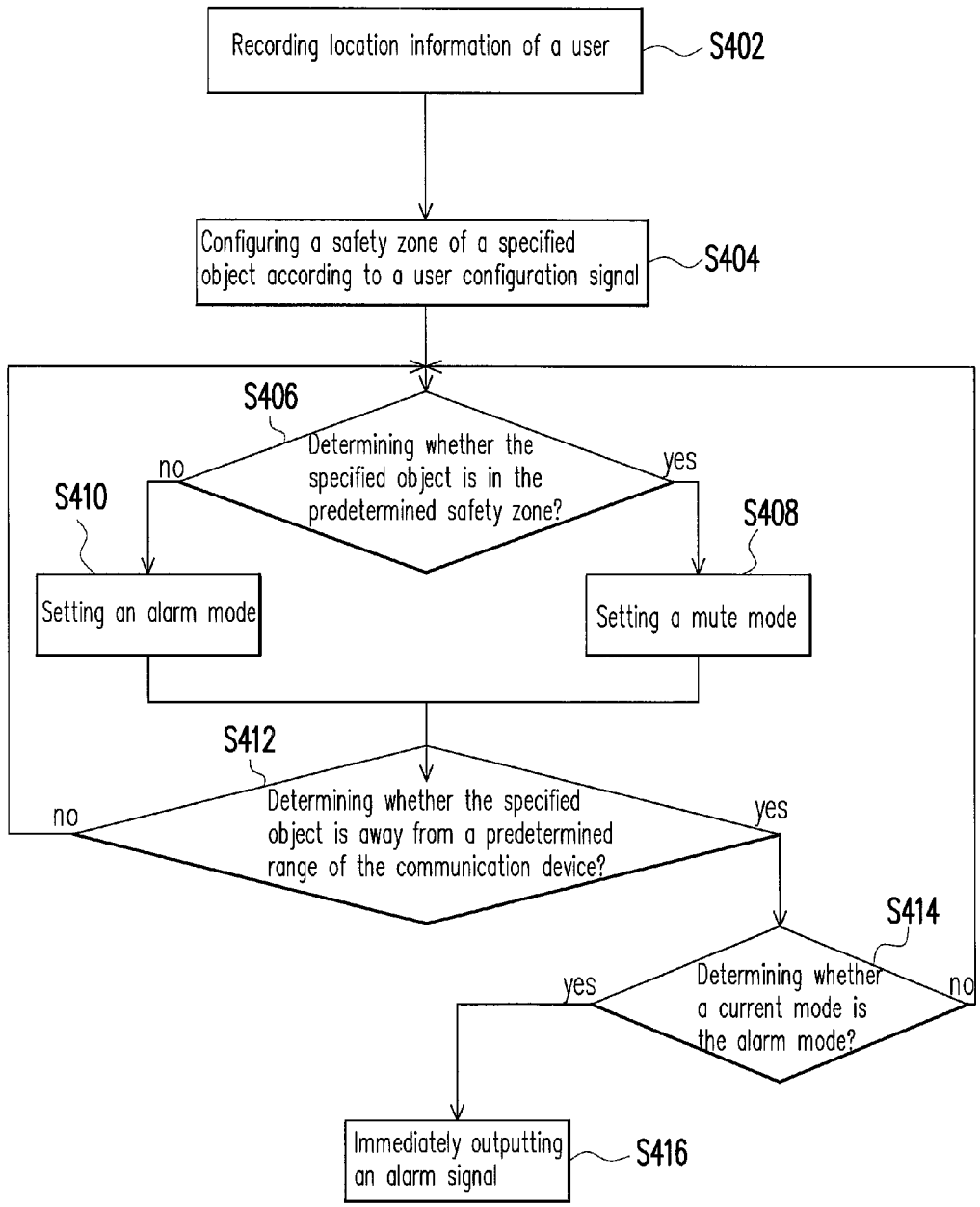
FIG. 4 is a flowchart illustrating a method for reminding objects being away according to an embodiment of the invention.

FIG. 4 is a flowchart illustrating a method for reminding objects being away according to an embodiment of the invention. Referring to FIG. 1, FIG. 2 and FIG. 4, the method for reminding objects being away starts from step S402. The steps S402-S404 are respectively similar to the steps S302-S304, so that details thereof are not repeated herein. In step S406, the communication device 10 determines whether the specified object is in the safety zone, i.e., determines whether the electronic device 20 is in the safety zone. When a determination result indicates that the electronic device 20 is in the safety zone, step S408 is executed after the step S406. When the determination result indicates that the electronic device 20 is not in the safety zone (for example, the connection between the electronic device 20 and the communication device 10 is still maintained), step S410 is executed after the step S406.

In the step S408, the control module 12 of the communication device 10 sets the operation mode of the electronic device 20 to the mute mode, and step S412 is subsequently executed. In the step S410, the control module 12 of the communication device 10 sets the operation mode of the electronic device 20 to the alarm mode, and the step S412 is subsequently executed. The mute mode and the alarm mode are all recorded in the control module 22 of the electronic device 20.

In the step S412, the control module 22 determines whether the specified object is away from the predetermined range of the communication device 10. The control module 22 can determine whether the specified object is away from the communication device 10 according to whether the connection between the electronic device 20 and the communication device 10 is disconnected. When a determination result indicates that the electronic device 20 is away from the predetermined range of the communication device 10, step S414 is executed after the step S412. When the determination result indicates that the electronic device 20 is not away from the predetermined range of the communication device 10, it is returned to execute the step S406 after the step S412.

In the step S414, the control module 22 determines whether the current operation mode of the electronic device 20 is the alarm mode. When a determination result indicates that the operation mode of the electronic device 20 is set to the alarm mode, step S416 is executed after the step S414. When the determination result indicates that the operation mode of the electronic device 20 is not set to the alarm mode, after the step S414, a connection with the communication device 10 is re-established (not shown), and it is returned to execute the step S406. In the step S416, the control module 22 controls the alarm module 24 to provide an alarm signal to the user. After the step S416, the method for reminding objects being away is ended. In a practical application, the aforementioned steps S406 to S416 can be executed in cycles to repeatedly execute the method for reminding objects being away. Moreover, when a distance between the specified object and the communication device 10 is too long, and the specified object is not in the predetermined safety zone, an alarm signal is provided/output to the user.

Figure 5:
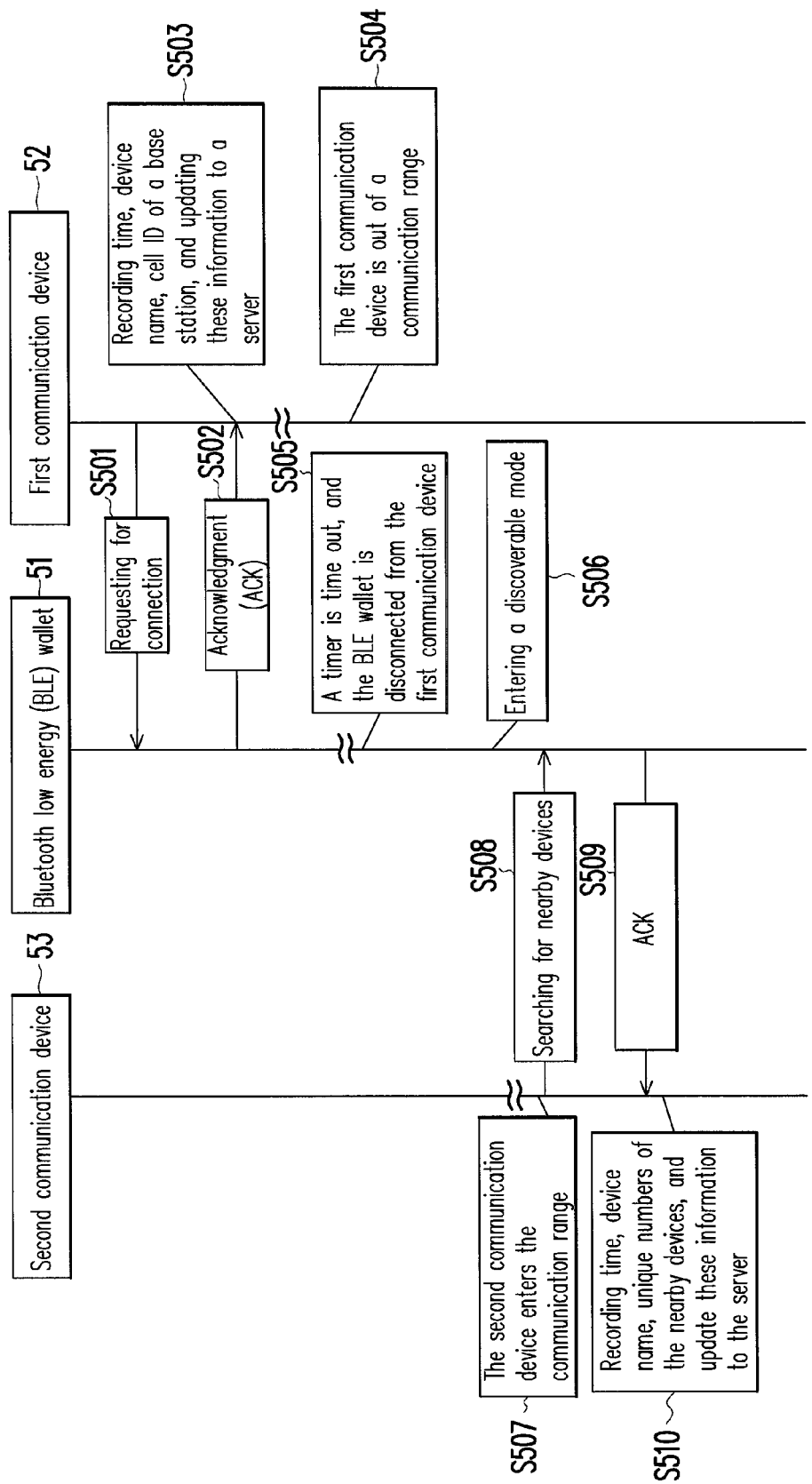
FIG. 5 is a flowchart illustrating an object tracking method according to an embodiment of the invention.

FIG. 5 is a flowchart illustrating an object tracking method according to an embodiment of the invention. The object tracking method of FIG. 5 is adapted to the electronic device 20, and in order to execute the object tracking method, the electronic device 20 is required to support a Bluetooth low energy (BLE) standard, so as to implement the object tracking method through a BLE tag. In the present embodiment, the object tracking method can be executed after the step S312 of FIG. 3, or executed after the step S416 of FIG. 4, so that the user can track a location of the specified object.

Referring to FIG. 2 and FIG. 5, in the object tracking method of FIG. 5, a BLE wallet, a first communication device 52 and a second communication device 53 are provided, though the invention is not limited thereto. The BLE wallet 51 has functionality similar to that of the electronic device 20, which supports the BLE standard and includes a timer (not shown). The first communication device 52 and the second communication device 53 can be mobile phones. The object tracking method of FIG. 5 starts from step S501. In the step S501, the BLE wallet 51 is originally possessed by a user of the first communication device 52, so that when the first communication device 52 detects the BLE wallet 51, the user controls the first communication device 52 to send a request signal for connection to the BLE wallet 51. In step S502, the BLE wallet 51 transmits an acknowledgement (ACK) to the first communication device 52. In step S503, a connection is established between the first communication device 52 and the BLE wallet 51, and environmental parameters related to the connection establishment are recorded, for example, time, a name of the device (the BLE wallet 51), and a cell ID of a base station of a wireless communication system. After the first communication device 52 records the environmental parameters, the first communication device 52 updates the environmental parameters to a predetermined server (not shown). The original user of the BLE wallet 51 can query for a current location of the BLE wallet 51 through the predetermined server, so as to quickly find the BLE wallet 51. In step S504, the first communication device 52 is out of a communication range of the BLE wallet 51.

In step S505, the timer of the BLE wallet 51 is configured for determining whether the connection is time out, and the BLE wallet 51 is disconnected from the first communication device 52. That is, the user loses the BLE wallet 51. In step S506, the BLE wallet 51 is forced to enter the discoverable mode.

In step S507, the second communication device 53 enters the communication range of the BLE wallet 51. In step S508, the second communication device 53 searches for nearby devices. In step S509, the BLE wallet 51 transmits an ACK to the second communication device 53, and establishes a connection with the second communication device 53. In step S510, the second communication device 53 records environmental parameters related to the connection establishment, for example, time, a name of the device (the BLE wallet 51), and unique numbers of the nearby devices, and the second communication device 53 updates the environmental parameters to the predetermined server.

After the step S510, the object tracking method is ended. In a practical application, the aforementioned steps S501 to S510 can be executed in cycles between different communication devices to repeatedly execute the object tracking method, so that the user of the specified object can track the current location of the specified object.

Figure 6:
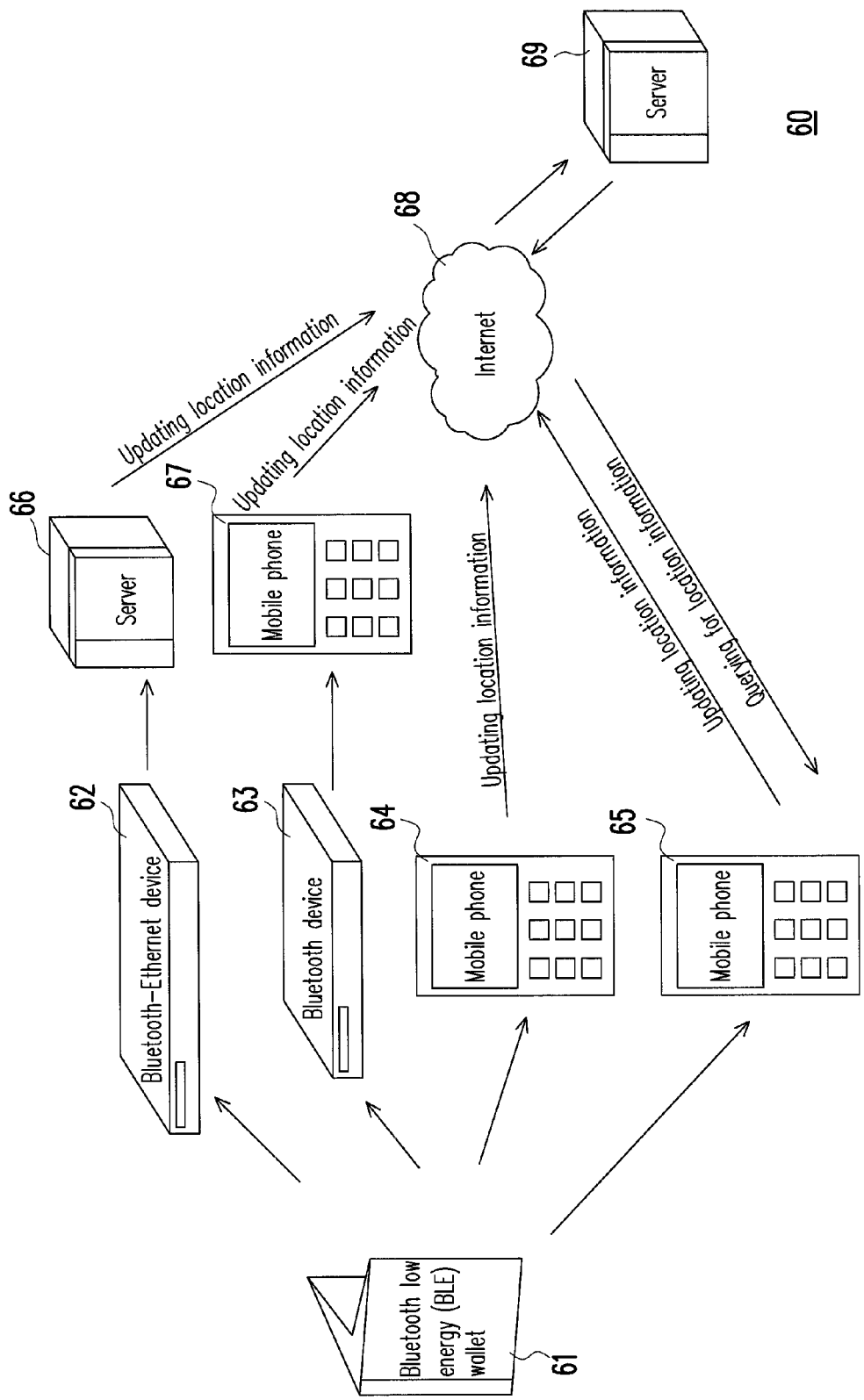
FIG. 6 is a schematic diagram of an object tracking system according to an embodiment of the invention.

FIG. 6 is a schematic diagram of an object tracking system according to an embodiment of the invention. The object tracking system 60 provides multiple ways to update object locations. The object tracking system 60 of FIG. 6 includes a BLE wallet 61, a Bluetooth-Ethernet device 62, a Bluetooth device 63, a mobile phone 64, a mobile phone 65, a server 66, a mobile phone 67, the Internet 68 and a server 69, though the invention is not limited thereto.

Several ways of updating the location of the BT wallet 61 are introduced below with reference of FIG. 6. A first way of updating location information is described as follows. A connection between the BLE wallet 61 and the Bluetooth-Ethernet device 62 is established, and the Bluetooth-Ethernet device 62 records ambient environmental parameters of the BLE wallet 61, where the environmental parameters include the location information of the BLE wallet 61. Then, the Bluetooth-Ethernet device 62 updates the location information of the BLE wallet 61 to the server 66, and the server 66 updates the location information to the server 69 through the Internet 68. The server 69 is the predetermined server mentioned in the embodiment of FIG. 5, which is configured for storing the locations of the BLE wallet 61 updated through various ways.

A second way of updating the location information is described as follows. A connection between the BLE wallet 61 and the BT device 63 is established, and the BT device 63 records ambient environmental parameters of the BLE wallet 61, where the environmental parameters include the location information of the BLE wallet 61. Then, the Bluetooth device 63 transmits the location information of the BLE wallet 61 to the mobile phone 67, and the mobile phone 67 updates the location information to the server 69 through the Internet 68.

A third way of updating the location information is described as follows. A connection between the BLE wallet 61 and the mobile phone 64 is established, and the mobile phone 64 records ambient environmental parameters of the BLE wallet 61, where the environmental parameters include the location information of the BLE wallet 61. Then, the mobile phone 64 updates the location information to the server 69 through the Internet 68.

A fourth way of updating the location information is described as follows. A connection between the BLE wallet 61 and the mobile phone 65 is established, and the mobile phone 65 records ambient environmental parameters of the BLE wallet 61, where the environmental parameters include the location information of the BLE wallet 61. Then, when the mobile phone 65 receives a query location information request that is unicast, broadcast or multicast by the server 69 for querying the final location of the BLE wallet 61, the mobile phone 65 updates the location information of the BLE wallet 61 to the server 69 through the Internet 68.

Figure 7:
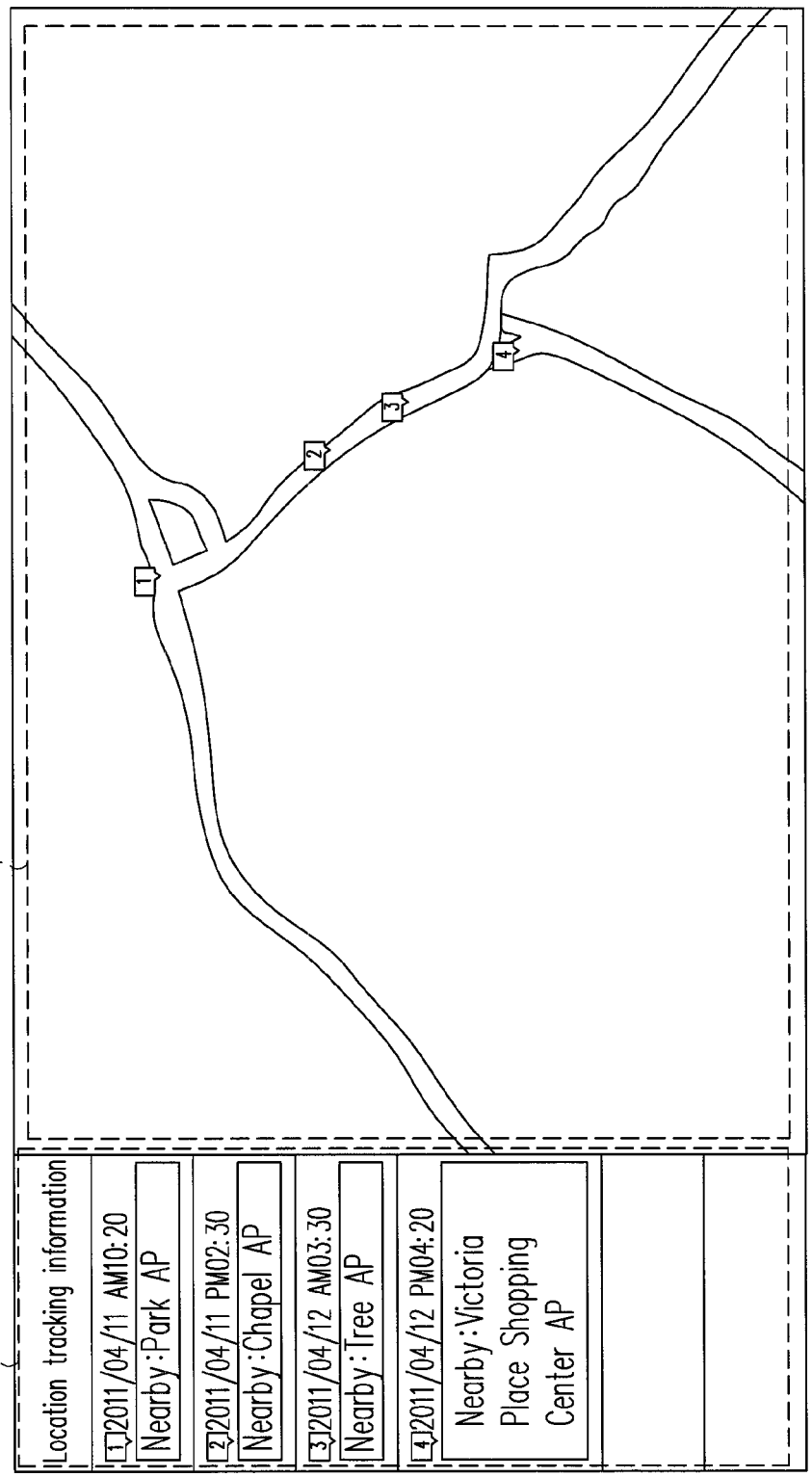
FIG. 7 is a schematic diagram of object location tracking information according to an embodiment of the invention.

FIG. 7 is a schematic diagram of object location tracking information according to an embodiment of the invention. When the predetermined server continually records the locations of the specified object (for example, the BLE wallet 61 with the location information updated by the object tracking system 60), FIG. 7 illustrates an exemplary picture, from where the user can learn the location of the specified object. The exemplary picture includes location tracking information 71 (of the specified object) and an electronic map 72. For example, the location tracking information 71 lists locations, recording time and corresponding names of four nearby access points (APs). For example, the first recorded location is near "Park AP", the second recorded location is near "Chapel AP", the third recorded location is near "Tree AP", and the fourth recorded location is near "Victoria Place Shopping Center AP". The recorded locations are displayed on the electronic map 72, so that the user can easily track a passing route of the specified object, and quickly find the specified object.

The invention further provides a computer readable medium, which stores a computer executable program for implementing various steps of the aforementioned method for reminding objects being away. The computer executable program is composed of a plurality of program instructions (for example, an organization chart establishing program instruction, a table approving program instruction, a setting program instruction, and a deployment program instruction, etc), and these program instructions are loaded into the communication device and executed by the same to accomplish various steps of the method for reminding objects being away and various functions of the communication device described previously.

In summary, embodiments of the invention provide the method for reminding objects being away, the communication device and the computer readable medium using the same. By using a wireless communication technique to determine whether the specified object is within the predetermined safety zone, a situation of sending an unnecessary alert when the specified object is away from the user is avoided. Moreover, when the specified object is indeed away from the user, multiple ways and methods are provided to obtain the object location tracking information. In this way, the ambient devices of the specified object can be configured to report and update the location information of the specified object, so that the user can quickly find the lost specified object.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for reminding objects being away, adapted to a communication device, and the method for reminding objects being away comprising:
   recording location information of the communication device;
   establishing a connection between the communication device and a specified object;
   configuring a safety zone of the specified object according to a user configuration signal;
   determining whether the specified object is away from a predetermined range of the communication device carried by a user;
   determining whether the specified object is not in the safety zone; and
   providing an alarm signal to the user when it is determined that the specified object is away from the predetermined range of the communication device and is not in the safety zone.

2. The method for reminding objects being away as claimed in claim 1, wherein when it is determined that the specified object is not away from the predetermined range of the communication device, it is continually determined whether the specified object is away from the communication device.

3. The method for reminding objects being away as claimed in claim 1, further comprising:
   recording environmental parameters of the specified object into the communication device when it is determined that the specified object is away from the predetermined range of the communication device but is still in the safety zone.

4. The method for reminding objects being away as claimed in claim 1, further comprising:
   setting an operation mode of the specified object to an alarm mode when it is determined that the specified object is not in the safety zone; and
   setting the operation mode of the specified object to a mute mode when it is determined that the specified object is in the safety zone.

5. The method for reminding objects being away as claimed in claim 4, wherein after the step of setting the operation mode of the specified object to the alarm mode or the mute mode, the method further comprises:

determining whether the specified object is away from the predetermined range of the communication device.

6. The method for reminding objects being away as claimed in claim 5, further comprising:
determining again whether the specified object is not in the safety zone when it is determined that the specified object is not away from the predetermined range of the communication device.

7. The method for reminding objects being away as claimed in claim 5, further comprising:
determining whether the operation mode of the specified object is the alarm mode when it is determined that the specified object is away from the communication device; and
immediately outputting the alarm signal to the user when it is determined that the operation mode of the specified object is the alarm mode.

8. The method for reminding objects being away as claimed in claim 1, further comprising:
setting the specified object to a discoverable mode when it is determined that the specified object is away from the predetermined range of the communication device and is not in the safety zone; and
establishing a connection between the specified object and at least one nearby communication device, wherein the at least one nearby communication device records location information of the specified object, and the at least one nearby communication device transmits the location information of the specified object to a server.

9. The method for reminding objects being away as claimed in claim 8, further comprising:
sending, at the server, a query location information request to the at least one nearby communication device established with the connection to the specified object; and
obtaining, at the server, the updated location information of the specified object from one of the at least one nearby communication device.

10. The method for reminding objects being away as claimed in claim 1, wherein the specified object establishes a connection with the communication device or at least one nearby communication device through an embedded electronic device.

11. A communication device, adapted to remind objects being away, and comprising:
a positioning module, configured for obtaining a current location of the communication device;
a communication module, configured for establishing a connection with a specified object;
a control module, connected to the positioning module and the communication module, configured for recording the current location of the communication device, configuring a safety zone of the specified object according to a user configuration signal, determining whether the specified object is away from a predetermined range of the communication device carried by a user, and determining whether the specified object is not in the safety zone; and
an alarm module, connected to the control module, configured for providing an alarm signal to the user when the control module determines that the specified object is away from the predetermined range of the communication device and is not in the safety zone.

12. The communication device as claimed in claim 11, wherein when the control module determines that the specified object is not away from the predetermined range of the communication device, the control module continually determines whether the specified object is away from the communication device.

13. The communication device as claimed in claim 11, wherein when the control module determines that the specified object is away from the predetermined range of the communication device but is still in the safety zone, the control module records environmental parameters of the specified object.

14. The communication device as claimed in claim 11, wherein:
when the control module determines that the specified object is not in the safety zone, the control module sets an operation mode of the specified object to an alarm mode; and
when the control module determines that the specified object is in the safety zone, the control module sets the operation mode of the specified object to a mute mode.

15. The communication device as claimed in claim 14, wherein after the control module sets the operation mode of the specified object, the control module determines whether the specified object is away from the predetermined range of the communication device.

16. The communication device as claimed in claim 14, wherein when the control module determines that the specified object is not away from the predetermined range of the communication device, the control module determines again whether the specified object is not in the safety zone.

17. A computer readable medium, storing a computer executable program, wherein when the computer executable program is loaded to a communication device, the communication device executes at least following steps:
recording location information of the communication device;
establishing a connection between the communication device and a specified object;
configuring a safety zone of the specified object according to a user configuration signal;
determined whether the specified object is away from a predetermined range of the communication device carried by a user;
determined whether the specified object is not in the safety zone; and
providing an alarm signal to the user when it is determined that the specified object is away from the predetermined range of the communication device and is not in the safety zone.

* * * * *